(No Model.)
G. A. RICHARDS.
CHANGEABLE GEAR MECHANISM.
No. 597,914.　　　　　　　　　Patented Jan. 25, 1898.
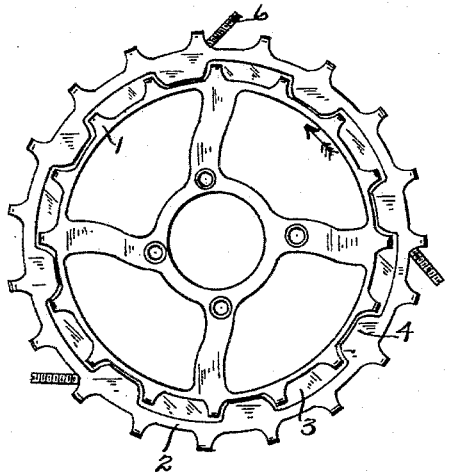
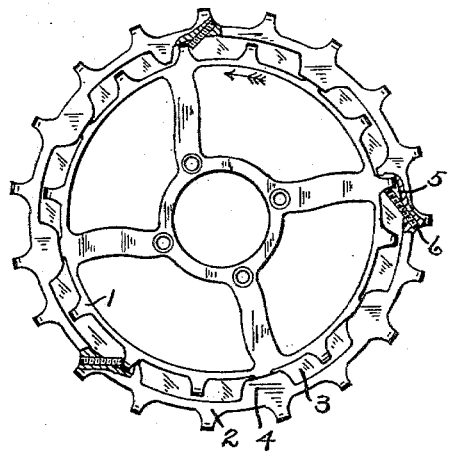
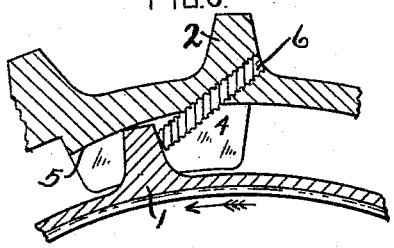
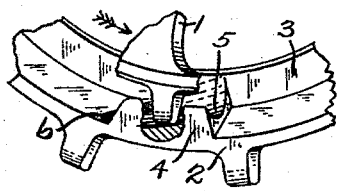
WITNESSES:
Horace B Jones
Jula Green
INVENTOR
George A. Richards
BY
V. H. Lockwood
His ATTORNEY.

UNITED STATES PATENT OFFICE.

GEORGE A. RICHARDS, OF INDIANAPOLIS, INDIANA, ASSIGNOR TO THE McELWAINE-RICHARDS COMPANY, OF SAME PLACE.

CHANGEABLE-GEAR MECHANISM.

SPECIFICATION forming part of Letters Patent No. 597,914, dated January 25, 1898.

Application filed November 23, 1896. Serial No. 613,077. (No model.)

*To all whom it may concern:*

Be it known that I, GEORGE A. RICHARDS, of Indianapolis, county of Marion, and State of Indiana, have invented a certain new and useful Changeable-Gear Mechanism; and I do hereby declare that the following is a full, clear, and exact description thereof, reference being had to the accompanying drawings, in which like figures refer to like parts.

The object of my invention is to enable one to quickly change the gear of his bicycle or any other device where sprocket-wheels are used from a lower to a higher speed, or, conversely, from a gear requiring greater to one requiring less power to propel it. This is accomplished in my invention by having a rim provided with sprocket-teeth that is readily secured to or detached from the rim of a complete sprocket-wheel. The separable rim is of greater diameter than the nonseparable rim of the sprocket-wheel, so that the former rests upon and surrounds the latter, thus having the effect of increasing the diameter of the gear as a whole when the separable rim is added, whereby the speed is increased. This outer rim obviously carries a greater number of teeth than the inner or sprocket wheel proper. I have herein shown the inner rim carrying sixteen and the outer one nineteen teeth, there being an increase of three teeth. On each rim the teeth are equidistant, so that the same sprocket-chain may be used on either.

The features of my invention consist in holding the rim on the sprocket by the engagement of the teeth with a series of slightly-inclined surfaces on the inner periphery of the rim, whereby the teeth will wedge against said surfaces. By this means the additional rim is self-centering. Also said inner surfaces are so inclined that the forward driving of the sprocket-wheel tightens the engagement of the teeth with the rim, and thereby holds it on. By this arrangement the rim, although a rigid one, can be secured on the wheel without bolting the two together.

The full nature of my invention will appear from the accompanying drawings and the description and claims following.

In the drawings, Figure 1 is a side elevation of my changeable-gear mechanism with the parts in position for the attachment or detachment of the separable rim. Fig. 2 shows a device in working order, the outer rim, however, being broken away at three points to disclose the position and function of the holding-screws. Fig. 3 is a central vertical section of a small portion of the device with the parts somewhat enlarged. Fig. 4 is a perspective of a small section of the device with parts broken away to show the relative position of the parts when in working condition.

In detail I use a complete sprocket-wheel of the ordinary type, having the rim 1. This sprocket-wheel can be made in any well-known manner. The rim here shown contains sixteen teeth, whose distance from each other is adapted to the chain to be used. This sprocket-wheel is placed on the bicycle pedal-shaft in any well-known way and is of such diameter as is best suited for general use.

When the bicyclist desires to increase the speed of the bicycle or for any other reason he desires to change its gearing, he removes his sprocket-chain and places on the sprocket-wheel the detachable rim 2, which is light and easily carried with him. Such rim is provided with teeth the same distance apart as those of the sprocket-wheel proper, both being adapted to his chain. He then by suitable tools adds a readily-detachable link or two to lengthen the chain and places it about the sprocket-wheel as thus enlarged. It is obvious that by increasing the diameter of the sprocket-wheel the speed will be increased as the ratio of the diameter of the sprocket-wheel on the pedal-shaft to that of the sprocket-wheel on the rear bicycle-wheel hub will be increased. The effect of the increase in diameter effected by this arrangement may be greater or less, as the party desires. In the device I have shown the increase is reasonable, but not great; but by increasing the thickness of the rim the increase in diameter may be carried to any desired extent. Such additional increase in the diameter of the wheel does not alter the means of attaching the detachable rim to the sprocket-wheel proper. The only difference it would cause would be the necessity of increasing the length of the chain more than if the thickness of the detachable rim were slight, as shown herein.

Aside from the plan of changing the speed which I have above outlined a feature of my invention lies in the means whereby the detachable rim is attached and held in place. This rim consists of a main portion, to which teeth are secured, with a continuous flange 3 on one side of the rim and short sectional flanges 4 on the other side of the rim. Between each short sectional flange 4 on the one side and the continuous flange 3 on the other side I provide an inclined or cam-like surface 5, as seen in Figs. 3 and 4. These cam-like surfaces are all inclined in the same direction. At one end the surface of the incline is flush with the inner periphery of the main body of the rim 2, and from that such surface is inclined so that at its other end there will be a slight offset of necessity, as appears in said Figs. 3 and 4. The number of these inclined surfaces 5 may be such as desired; but they must of necessity be so placed that when the outer rim is attached to the sprocket-wheel several of the teeth on the sprocket-wheel proper will engage the inclined or cam-like surfaces 5, preferably about their middle point, as seen in Figs. 2, 3, and 4. Also the number and location of these inclined surfaces 5 and the short flanges 4 should be such that the outer rim 2 can be placed over the sprocket-wheel proper, as seen in Fig. 1, by a sidewise movement of the outer rim—that is, the short flanges are short enough to pass between the teeth of the sprocket-wheel proper. The diameter of the main body of the outer rim 2 should be just enough greater than the diameter of the sprocket-wheel proper from the point of one tooth to the point of the opposite one to enable the outer rim to be slipped over the sprocket-wheel, as seen in Fig. 1.

After the outer rim has been slipped over the sprocket-wheel, as seen in Fig. 1, and as I have just described, such outer rim is turned on the sprocket-wheel until the teeth thereof engage the inclined or cam-like surfaces 5 and wedge in tightly between the same. These cam-like surfaces should be so inclined that the pull of the sprocket-chain on the outer rim will tend to tighten the engagement between such inclined surfaces and the teeth on the sprocket-wheel proper—that is, the pull should be in the direction with reference to such inclined surface as is indicated by the arrows in the drawings.

It is obvious that after the outer rim has thus been placed on the sprocket-wheel the regular pull of the sprocket-chain will tend to tighten the connection between the two parts. In order, however, to hold the outer rim securely in place, I insert the screw-bolts 6 diagonally through the outer rim, as seen in Figs. 2 and 3, so that the inner end of such screw-bolt would engage a tooth on the sprocket-wheel proper and hold it in close engagement with the inclined or cam-like surface 5. The length of these screw-bolts should be such that when they are screwed down their outer ends will be flush with the surface of the outer rim, as seen in Fig. 3. The number of these screw-bolts may be such as desired, one sufficing, but three being preferable.

What I claim as my invention, and desire to secure by Letters Patent, is—

1. A removable rim for sprocket-wheels whose internal surface is provided with a series of annular inclined or tapering grooves adapted to receive the teeth on the sprocket-wheel.

2. A removable rim for sprocket-wheels having exterior peripheral sprocket-teeth and provided with inwardly-projecting annular notched flanges on the opposing sides thereof, and means for securing said rim to a sprocket-wheel.

3. The combination with a sprocket-wheel, of an additional rim with flanges extending on both sides of the teeth of the sprocket-wheel and a series of inclined surfaces between such flanges against which such teeth may wedge, said surfaces being so inclined that the forward movement of the sprocket-wheel will tend to tighten the engagement of its teeth with the additional rim, and means for holding the teeth in engagement with such inclined surfaces.

4. The combination with a sprocket-wheel, of an additional rim with flanges inwardly extending on both sides of the teeth of the sprocket-wheel, the flanges on one side being short enough to pass between such teeth when the rim is being slipped over the wheel, and means for preventing, when desired, the independent rotary movement of the additional rim.

In witness whereof I have hereunto set my hand this 19th day of November, 1896.

GEORGE A. RICHARDS.

Witnesses:
V. H. LOCKWOOD,
ZULA GREEN.